United States Patent
Ikram Ul Haq

(10) Patent No.: US 11,121,657 B2
(45) Date of Patent: Sep. 14, 2021

(54) METHOD OF CONTROLLING AN ELECTRICAL MACHINE

(71) Applicant: ABB Schweiz AG, Baden (CH)

(72) Inventor: Omer Ikram Ul Haq, Surahammar (SE)

(73) Assignee: ABB Schweiz AG, Baden (CH)

( * ) Notice: Subject to any disclaimer, the term of this patent is extended or adjusted under 35 U.S.C. 154(b) by 61 days.

(21) Appl. No.: 16/746,331

(22) Filed: Jan. 17, 2020

(65) Prior Publication Data

US 2020/0235687 A1    Jul. 23, 2020

(30) Foreign Application Priority Data

Jan. 18, 2019  (EP) .................................. 19152532

(51) Int. Cl.
  *H02P 21/13*   (2006.01)
  *H02P 21/18*   (2016.01)
  *H02P 21/22*   (2016.01)

(52) U.S. Cl.
  CPC .............. *H02P 21/13* (2013.01); *H02P 21/18* (2016.02); *H02P 21/22* (2016.02)

(58) Field of Classification Search
  CPC ........... H02P 21/13; H02P 21/18; H02P 21/22
  USPC ............................... 318/400.02, 400.01, 700
  See application file for complete search history.

(56) References Cited

U.S. PATENT DOCUMENTS

| | | | |
|---|---|---|---|
| 5,994,870 A | 11/1999 | Kaneko et al. | |
| 6,320,349 B1 | 11/2001 | Kaneko et al. | |
| 9,698,722 B2 * | 7/2017 | Loken ..................... | H02P 29/68 |

FOREIGN PATENT DOCUMENTS

EP        1334552 A2       8/2003

OTHER PUBLICATIONS

European Extended Search Report Application No. 19152532.8 Completed: Jun. 27, 2019; dated Jul. 8, 2019 10 Pages.

* cited by examiner

*Primary Examiner* — David Luo
(74) *Attorney, Agent, or Firm* — Whitmyer IP Group LLC

(57)  ABSTRACT

A method is described for estimating a position of a rotor in a synchronous electric machine having a rotor. The method has the steps of: inputting the initial rotor angle into a power converter, injecting a first voltage waveform with a first fundamental frequency into the power converter,—injecting a second voltage waveform with a second fundamental frequency into the power converter, the second voltage waveform being offset with an offset angle δθ, determining a resulting second axis current in the power converter at the second fundamental frequency, adjusting, for each torque value, the offset angle δθ so that the resulting second axis current at the second fundamental frequency becomes zero, and estimating the position of the rotor based on the plurality of offset angle values.

16 Claims, 4 Drawing Sheets

METHOD OF CONTROLLING AN ELECTRICAL MACHINE

TECHNICAL FIELD

The present disclosure generally relates to electrical machines and in particular to a method of controlling an electrical machine.

BACKGROUND

Injection methods for estimating the electric position of an electrical machine may be used instead of employing sensors for detecting the electrical position. One example of such a method is disclosed in EP1334552B1. According to the method disclosed in EP1334552B1 a first signal is injected into the d-axis, and an observer controller is provided for measuring current feedback response to the injected first signal to determine an estimated position of the motor.

One drawback with the method disclosed in EP1334552B1 is that it will result in poor precision when determining the estimated position in certain types of electrical machines because the method does not take the presence of the cross-coupling inductance/flux into account.

SUMMARY

An object of the present invention is to provide a method which solves, or at least mitigates, the problems of the prior art.

Another object of the present invention is to provide a method for estimating an error $\Delta\theta$ in an estimated position of a rotor in a synchronous electric machine, wherein said estimation is performed by injecting a signal into a first axis in the electric machine.

The error is due to the cross-coupling inductance between the different axes of the electric machine.

The independent method claim fulfils at least one of the above objects.

Further advantages are achieved with the features of the dependent claims.

According to a first aspect of the present invention a method is provided for estimating a position of a rotor in a synchronous electric machine. The method comprises the steps of inputting an initial rotor angle, in a known reference frame, into a power converter controlling the electric machine, injecting a first voltage waveform into the power converter, wherein the first voltage waveform has a first fundamental frequency and comprises a component along a first axis of the reference frame and a component along a second axis being orthogonal to the first axis, and wherein the first voltage waveform is such that it effects the torque from the machine to vary between at least one positive torque value and at least one negative torque value and that the mean output torque is zero, injecting a second voltage waveform into the power converter, wherein the second voltage waveform has a second fundamental frequency and comprises a component which is offset with an offset angle $\delta\theta$ with respect to the first axis in the reference frame, determining a resulting second axis current in the power converter at the second fundamental frequency, adjusting, for each torque value, the offset angle $\delta\theta$ so that the resulting second axis current at the second fundamental frequency becomes zero, and storing a respective plurality of offset angle values, and estimating the position of the rotor (2) based on the plurality of offset angle values.

With the method according to the invention the estimated position corresponds to the offset angle of the electric machine. This is due to the fact that the initial rotor angle is known and is input to the power converter. Thus, as the initial angle is known and taken into account the estimation of the offset angle is performed as if the rotor was at the zero position.

By injecting a first voltage waveform as defined above the rotor remains essentially stationary. This makes it possible to measure at a number of different torque settings without having to realign the rotor. When the torque changes from a positive torque to a negative torque the initial offset angle for the adjustment of the offset angle is equal to the resulting offset angle for the preceding positive torque value.

The first axis may refer to either the q-axis or the d-axis of the electric machine.

The power converter may comprise a first vector rotator and a second vector rotator, wherein the first vector rotator is arranged to convert, using the initial rotor angle as input, the first voltage waveform and the second voltage waveform in the reference frame to voltages in the stationary frame of the electric machine, and wherein the second vector rotator is arranged to convert using the initial rotor angle as input, the currents in the electric machine from the stationary frame of the electric machine to the reference frame. This is a favorable implementation of the power converter in which the initial rotor angle is easily taken into account as the initial rotor angle may be input into the first vector rotator and the second vector rotator.

At least one positive and one negative torque are applied. The number of torques that are applied depends on the accuracy with which the offset angle is to be determined. If only a maximum negative torque and a maximum positive torque are applied the offset angles may be predicted by assuming that the offset angle is zero at zero torque and that the offset angle increases linearly with the applied torque. This is a reasonable approximation for some electric machines. However, for some machines this leads to unacceptable errors.

The first voltage waveform may have an incrementally increasing or decreasing amplitude. This, enables the measurement of the offset angle at a number of torque values in an efficient manner. The number of different torque values depends on the desired resolution and may typically be, e.g., 10-1000 different torque values.

The amplitude may increase in such a way that the resulting torque of the machine increases from a value in the range of 0-10% of the maximum torque to a value of 80-100% of the maximum torque. It is not necessary to measure at zero torque as the offset angle is zero at zero torque. Also, about 10 different torque values would give a good approximation of the offset angles as a function of the torque. Thus, a first offset angle could be determined at a torque value of 10% and a last offset angle could be determined at 90%.

The amplitude may decrease in such a way that the resulting torque of the machine decreases from a value in the range of 80-100% of the maximum torque to a value of 0-10% of the maximum torque. This would give the same result as is discussed in the previous paragraph.

The frequency of the first voltage waveform may be is 20-100 Hz. This is a sufficiently high frequency to prevent any essential movement of the rotor due to the inertia of the rotor.

The frequency of the second voltage waveform is higher than the frequency of the first voltage waveform, and preferably higher than 200 Hz. The upper limit for the frequency of the second voltage waveform is half of the switching frequency of the power converter. The switching frequency may be as high as 10 kHz and is typically about 4 kHz, which would give a maximum frequency of 2 kHz on the second voltage waveform.

The adjusting, for each torque value, of the offset angle is performed using a control loop feedback mechanism. This is a fast and reliable method for adjusting the offset angle.

The control loop feedback mechanism may apply a correction based on at least an integral term, preferably an integral and a proportional term.

According to a second aspect of the present invention a computer program is provided comprising computer executable components, which when executed by processing circuitry of a control system causes the control system to perform the steps of the method according to the first aspect of the invention or any of the preferred features described in connection with the first aspect.

The advantages of such a computer program are similar to those advantages described in relation to the first aspect of the invention.

According to a third aspect of the invention a control system is provided for controlling an electrical machine. The control system comprises processing circuitry, and a storage medium comprising a computer program which when executed by the processing circuitry causes the control system to perform the steps of the method according to the first aspect of the invention.

According to a fourth aspect of the invention an electrical power system is provided comprising an electrical machine, a power converter configured to control the electrical machine, and a control system according to the third aspect of the invention, configured to control the power converter.

BRIEF DESCRIPTION OF THE DRAWINGS

In the following description of preferred embodiments of the invention reference will be made to the accompanying drawings, in which.

DESCRIPTION OF PREFERRED EMBODIMENTS

Figure 1:
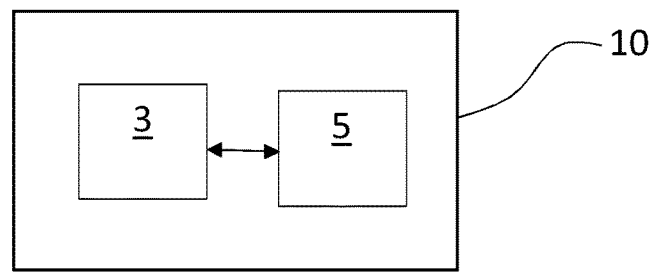
FIG. 1 schematically shows an example of a control system according to an embodiment of the invention.

In the following description of preferred embodiments similar features in the different drawings will be denoted with the same reference numeral.

FIG. 1 shows an example of a control system 10 for controlling an electrical machine 1, such as a motor or a generator having a stator and a salient pole rotor, by means of a power converter. The electrical machine may for example be a synchronous machine, such as a surface mounted permanent magnet machine, an interior permanent magnet synchronous machine, a permanent magnet assisted synchronous machine, or a synchronous reluctance machine.

The control system 10 comprises a storage medium 3 and processing circuitry 5. The storage medium comprises computer code which when executed by the processing circuitry 5 causes the control system 1 to perform the steps of the methods described herein.

The storage medium 3 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The processing circuitry 5 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of a power converter and an electrical machine.

Figure 2:
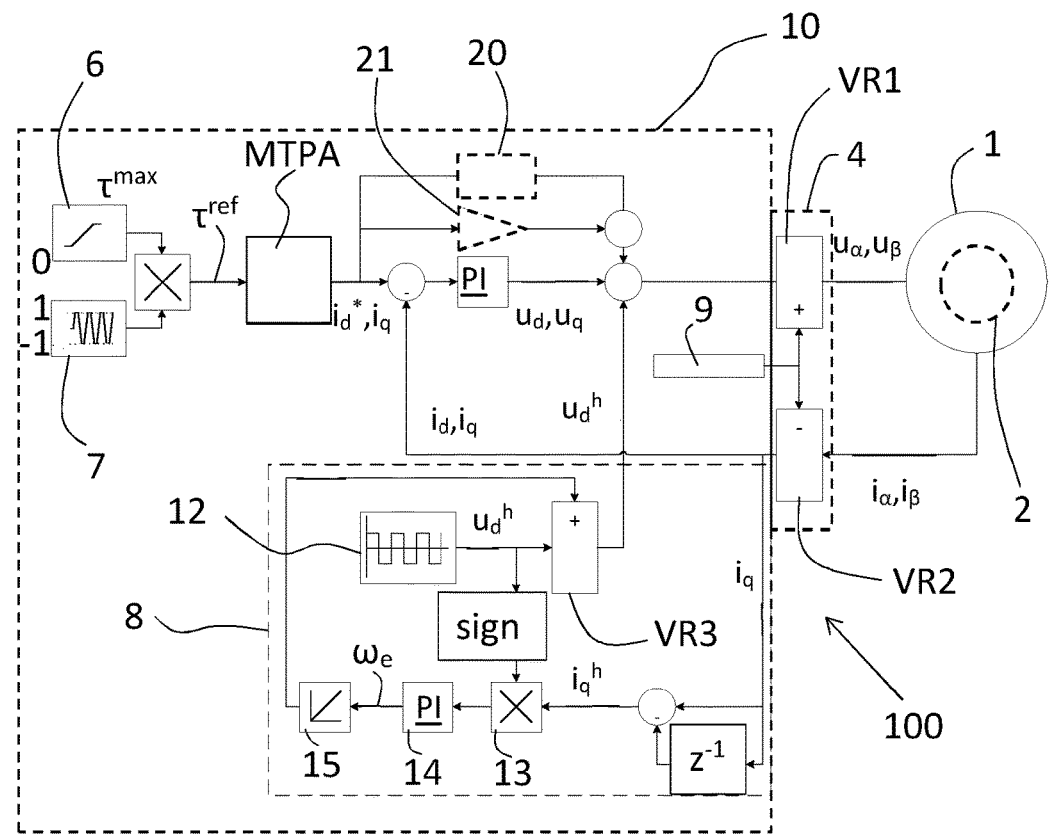
FIG. 2 shows a block diagram of the control system in an electrical power system.

FIG. 2 shows an example of a particular realization of the control system 1, in terms of functional blocks. The functional blocks may be implemented in software and/or hardware. The control system 10 is configured to control a power converter 4 configured to control an electrical machine 1. The electrical machine 1 preferably has a rotor 2 with a salient pole structure. The control system 10, the power converter 4 and the electrical machine 1 form an electrical power system 100.

In the following, an exemplifying method for estimating the position of the rotor in a synchronous machine will be described. The estimation method may be performed with a part of the control system 10 in FIG. 2.

The control system 10 comprises an estimator 8 which will be described in more detail below. The estimator of FIG. 2 differs from the estimators of the prior art but will only be referred to schematically in the following description of the occurrence of the estimation error. The following equations describe the voltage balance in a non-hysteretic magnetic system where the only losses are related to copper losses:

$$u_d = i_d \cdot R_s + \frac{d\lambda_d}{dt} - \omega_{me}\lambda_q \quad (1.1)$$

$$u_q = i_q \cdot R_s + \frac{d\lambda_q}{dt} + \omega_{me}\lambda_d \quad (1.2)$$

In such cases where the magnetic relation between the d-axis currents and the d-axis fluxes is also affected by the q-axis current (and vice versa, when the q-axis quantities are affected by the d-axis current), a cross-coupling term $L_{dq}$ is introduced in the voltage equations. The following matrix expression originates from equations (1.1) and (1.2) with addition of the cross-coupling term.

$$\begin{bmatrix} u_d \\ u_q \end{bmatrix} = \begin{bmatrix} i_d \\ i_q \end{bmatrix} \cdot R_s + \begin{bmatrix} L_d & L_{dq} \\ L_{dq} & L_q \end{bmatrix} \cdot \frac{d}{dt} \begin{bmatrix} i_d \\ i_q \end{bmatrix} - \omega_{me} \begin{bmatrix} 0 & -1 \\ 1 & 0 \end{bmatrix} \cdot \begin{bmatrix} \lambda_d \\ \lambda_q \end{bmatrix} \quad (1.3)$$

For a high-frequency injection in the d-axis, the following voltage waveform is used:

$$\begin{bmatrix} u_d \\ u_q \end{bmatrix} = \begin{bmatrix} u_d^h \cos(\omega_h \cdot t) \\ 0 \end{bmatrix} \quad (1.4)$$

The high-frequency injection is output from the estimator 3 in FIG. 2. The injection in (1.4) is now applied to the (1.3). Since the injection is at relatively high frequencies, the resistive voltage part is usually neglected. Furthermore, since the injection is usually used at very low speeds, the voltage related to speed term is also very small, and thus it is neglected too. Consequently, the voltage equation (2.3) can be reduced to:

$$\begin{bmatrix} u_d^h \cos(\omega_h \cdot t) \\ 0 \end{bmatrix} = \begin{bmatrix} L_d & L_{dq} \\ L_{dq} & L_q \end{bmatrix} \cdot \frac{d}{dt} \begin{bmatrix} i_d^h \\ i_q^h \end{bmatrix} \quad (1.5)$$

Extracting the currents as function of the voltages, it follows $$\begin{bmatrix} i_d^h \\ i_q^h \end{bmatrix} = \int_0^t \begin{bmatrix} L_d & L_{dq} \\ L_{dq} & L_q \end{bmatrix}^{-1} \cdot \begin{bmatrix} u_d^h \cos(\omega_h \cdot t) \\ 0 \end{bmatrix} dt \quad (1.6)$$

As the supplied injected voltage is given in the estimated dq reference frame, an estimated electric position $\theta_{observer}$, not necessarily equal to the actual electric position, is considered. In presence of a position error $\Delta\theta$, the relation between the estimated position $\theta_{observer}$ and the actual position $\theta_{me}$ is:

$$\theta_{observer} = \theta_{me} + \Delta\theta \quad (1.7)$$

The difference between the estimated and the actual dq reference frame translates into a rotating matrix based on the position error $\Delta\theta$:

$$T(\Delta\theta) = \begin{bmatrix} \cos\Delta\theta & -\sin\Delta\theta \\ \sin\Delta\theta & \cos\Delta\theta \end{bmatrix} \quad (1.8)$$

Therefore, the high-frequency currents in the actual dq reference frame become:

$$\begin{bmatrix} \hat{i}_d^h \\ \hat{i}_q^h \end{bmatrix} = \int_0^t T(\Delta\theta) \cdot \begin{bmatrix} L_d & L_{dq} \\ L_{dq} & L_q \end{bmatrix}^{-1} \cdot T^{-1}(\Delta\theta) \cdot \begin{bmatrix} u_d^h \cos(\omega_h \cdot t) \\ 0 \end{bmatrix} dt \quad (1.9)$$

Solving (1.9) returns:

$$\begin{bmatrix} \hat{i}_d^h \\ \hat{i}_q^h \end{bmatrix} = \frac{u_d^h \cdot \sin(\omega_h \cdot t)}{2 \cdot \omega_h (L_d \cdot L_q - L_{dq}^2)} \begin{bmatrix} (L_d + L_q) + 2 \cdot L_{dq} \cdot \sin 2\Delta\theta - (L_d - L_q) \cdot \cos 2\Delta\theta \\ -2 \cdot L_{dq} \cdot \cos 2\Delta\theta - (L_d - L_q) \cdot \sin 2\Delta\theta \end{bmatrix} \quad (1.10)$$

As can be seen in (1.10), $\hat{i}_q^h$ can be demodulated (to remove the term $\sin(\omega_h \cdot t)$) and used for extracting rotor position.

$$\hat{i}_q^h = \frac{u_d^h}{2 \cdot \omega_h (L_d \cdot L_q - L_{dq}^2)} (-2 \cdot L_{dq} \cdot \cos 2\Delta\theta - (L_d - L_q) \cdot \sin 2\Delta\theta) \quad (1.11)$$

However, by controlling $\hat{i}_q^h = 0$, equation (1.11) introduces some position error which is equal to:

$$\Delta\theta = \frac{1}{2} \arctan\left(\frac{2L_{dq}}{L_q - L_d}\right) \quad (1.12)$$

Of course, an absence of $L_{dq}$ returns a zero position error, and the rotor position can be extracted by controlling $\hat{i}_q^h = 0$ without errors. In presence of a non-zero $L_{dq}$, by imposing $\Delta\theta = 0$ the equation (1.11) indicates the magnitude of the error signal $\varepsilon$ as a function of $L_{dq}$:

And if $\Delta\theta = 0$ the equation (1.11) will indicate the magnitude of the error signal i.e. $\varepsilon$ which is a function of $L_{dq}$ $$\varepsilon = -\frac{u_d^h}{\omega} \cdot \frac{L_{dq}}{L_d \cdot L_q - L_{dq}^2} \quad (1.13)$$

In order to determine $\Delta\theta$ the control system 10 of FIG. 2 may be used. In FIG. 2 the electric machine 1 is driven by a power converter 4. The power converter 4 comprises a first vector rotator VR1 which is arranged to rotate/convert the voltages $u_d$, $u_q$, which are input to the power converter in the reference frame to voltages $u_\alpha$, $u_\beta$, in the stationary frame of the electric machine 1. The power converter 4 also comprises a second vector rotator VR2 which is arranged to convert the currents $i_\alpha$, $i_\beta$, in the stationary frame of the electric machine to currents $i_d$, $i_q$, in the reference frame. The control system 10 comprises a ramp signal generator 6 which creates a ramp signal increasing from 0 to 1, and an oscillator 7 which creates an oscillating signal oscillating between −1 and 1. The signals from the ramp signal generator 6 and the signal from the oscillator 7 are multiplied to a torque input signal $\tau^{ref}$. The torque signal is an oscillating signal, which increases in amplitude from 0 to 1. The torque input signal is input to a conversion device also known as Maximum Torque Per Ampere MTPA. The conversion device MTPA arranged to interpret the input signal as a desired ratio of the maximum torque for the electric machine 1 to be output. To this end the conversion device comprises a lookup table to convert the torque signal $\tau^{ref}$ to currents to be input to the electric machine 1. The lookup table comprises data pairs for different ratios and currents and is based on, e.g., earlier made tests or simulations. The resulting currents $i_d^*$, $i_q^*$, output from the conversion device MTPA correspond to the desired currents to achieve the desired ratio of the maximum torque. The currents $i_d$, $i_q$, output from the second vector rotator VR2 are subtracted from the currents $i_d^*$, $i_q^*$, output from the conversion device MTPA and the result is input into a PI regulator which outputs the first voltage waveform $u_d$, $u_q$.

The control of the first voltage waveform $u_d$, $u_q$ is improved if an optional feed forward block 20 is provided which feeds forward the derivative of the current times the inductance L. Another optional block is the resistive voltage block 21.

The first step of the method for estimating a position of the rotor 2, is to input an initial rotor angle into the power converter 4. More specifically the initial rotor angle is input into each one of the first vector rotator VR1 and the second vector rotator VR2 from an angle block 9. In a second step the first voltage waveform $u_d$, $u_q$ is injected into the power converter 4, and more specifically into the first vector rotator VR1. The first voltage waveform $u_d$, $u_q$ has a first fundamental frequency which is determined by the oscillator 7 and comprises a component along a first axis and a component along a second axis being orthogonal to the first axis in a reference frame. Due to the oscillation of the first voltage waveform $u_d$, $u_q$ between positive and negative values the torque from the electric machine 1 will also vary between positive and negative torque values such that the mean output torque is zero. The first voltage waveform $u_d$, $u_q$ has a sufficiently high frequency so that the rotor 2 remains stationary. The rotor 2 remains stationary due to the inertia of the rotor 2. The frequency of the first voltage waveform $u_d$, $u_q$ is 20-100 Hz. This will result in the stator remaining stationary for all practically used stators.

The control system 10 comprises an estimator 8, which in a third step injects a second voltage waveform $u_d^h$ into the power converter 4, wherein the second voltage waveform $u_d^h$ has a second fundamental frequency and comprises a component which is offset with an offset angle $\delta\theta$ with respect to the first axis in the reference frame. The second voltage waveform $u_d^h$ has a frequency which is higher than the frequency of the first voltage waveform $u_d$, $u_q$, preferably above 200 Hz. In a preferred embodiment the frequency of the second voltage waveform $u_d^h$ is half of the switching frequency of the control system 10. In a fourth step a resulting second axis current $i_q^h$ in the power converter 4 is determined, at the second fundamental frequency. The second axis is in the direction orthogonal to the first axis. This is achieved by determining the total current $i_q$ in the second direction. The low frequency part of the total current $i_q$ in the second direction is filtered out. In the embodiment shown in FIG. 2 this is done using a delay circuit denoted $z^{-1}$. Due to the frequency of the second voltage waveform $u_d^h$ being half of the switching frequency of the control system 10 the subtraction of the delayed total current $i_q$ from the total current $i_q$ results in that only the second axis current $i_q^h$ at the second fundamental frequency remains. The switching frequency may be, e.g., 4 kHz. In a fifth step the offset angle $\delta\theta$ is adjusted, for each torque value, so that the resulting second axis current $i_q^h$ at the second fundamental frequency becomes zero. The offset angle $\delta\theta$ is equal to the error $\Delta\theta$ in estimated position of the rotor 2 at the present torque value when the resulting second axis current $i_q^h$ at the second fundamental frequency is zero. A plurality of offset angle values are stored for the plurality of torque values. In a sixth step the position of the rotor is estimated based on the plurality of offset angle values. For example, a conventional signal injection method can be used, the error of which is compensated by using the plurality of offset angle values.

The adjustment of the offset angle will now be described in short. The estimator 8 comprises an oscillator 12 which is arranged to output an oscillating voltage signal $u_d^h$ at the second fundamental frequency. The oscillating voltage signal is sent to an estimator vector rotator VR3, which rotates the oscillating voltage signal with an angle $\delta\theta$. This angle will eventually be equal to the offset angle $\Delta\theta$. The sign changed oscillating voltage signal is in block 13 multiplied with the resulting second axis current $i_q^h$ at the second fundamental frequency. The output from block 13 is input to a PI-controller 14, which outputs an estimator frequency $\omega_e$. The estimator frequency $\omega_e$ is integrated in an integrating block 15 adjusting $\delta\theta$ accordingly. The result of the integration in block 13 is input to the estimator voltage rotator VR3. The shown estimator uses a control loop feedback mechanism. The output from the integrating block will eventually be equal to the offset angle of the electric machine 1. The described estimation of the offset angle is performed for each torque value.

Figure 3A:
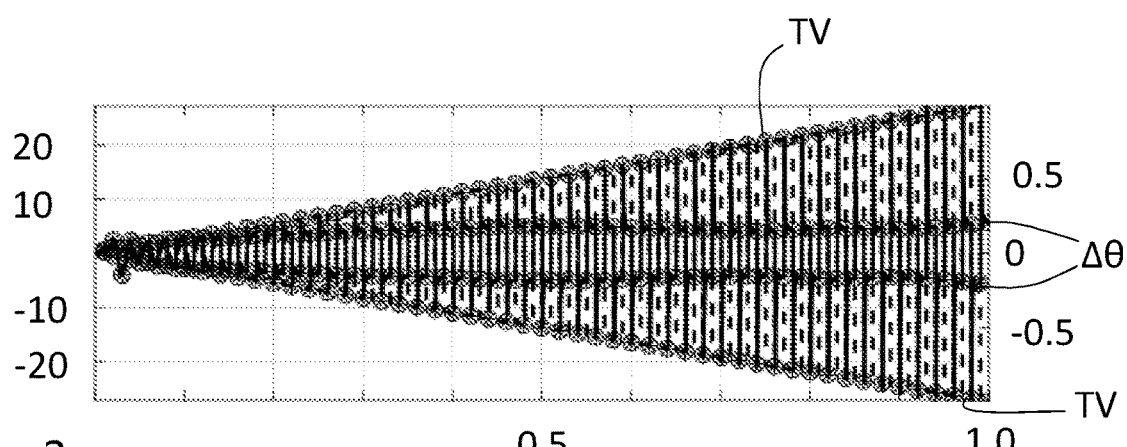
FIG. 3a shows the torque and the offset angle as a function of time during execution of the method according to an embodiment of the invention.

FIG. 3a shows the torque values TV and the resulting offset angles $\Delta\theta$ in degrees. The offset angle $\Delta\theta$ is shown on the left axis while the torque values TV are shown on the right axis as the ratio of the maximum torque. As can be seen in FIG. 3a the torque values vary between a positive torque value and a negative torque value and increases from 0 to ±1. The resulting offset angle $\Delta\theta$ increases from about 0 at zero torque to about 5 degrees at a torque setting of 100% of maximum torque.

Figure 3B:
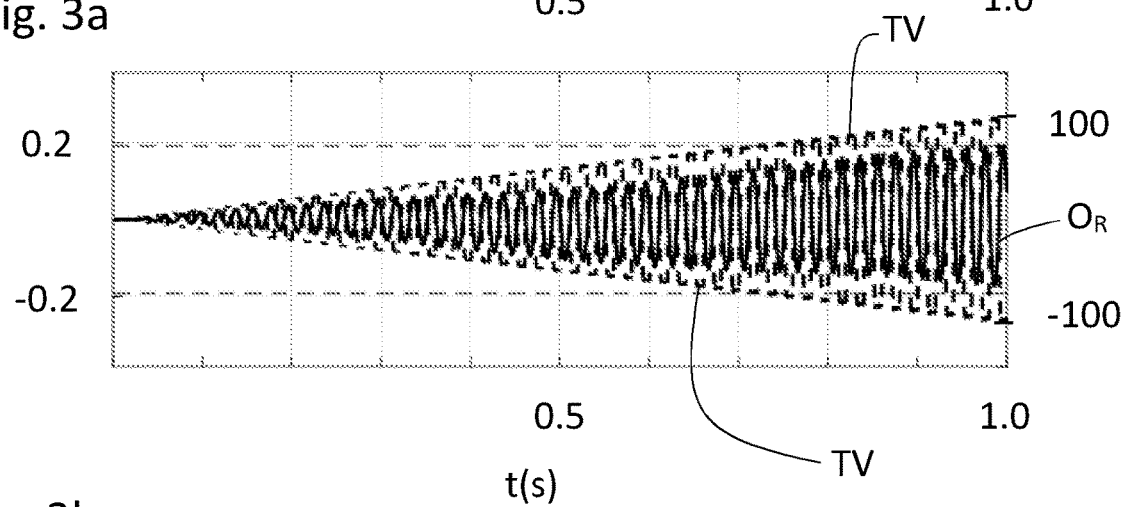
FIG. 3b shows the torque and the oscillations of the rotor as a function of time during execution of the method according to an embodiment of the invention.

FIG. 3b shows the torque values TV as a percentage of the maximum torque on the right axis and the resulting rotor oscillations $O_R$ in degrees on the left axis as a function of time. As can be seen in FIG. 3b the oscillations increase from zero degrees at zero torque to ±0.2 degrees at ±100% of the maximum torque.

Figures 4A, 4B:
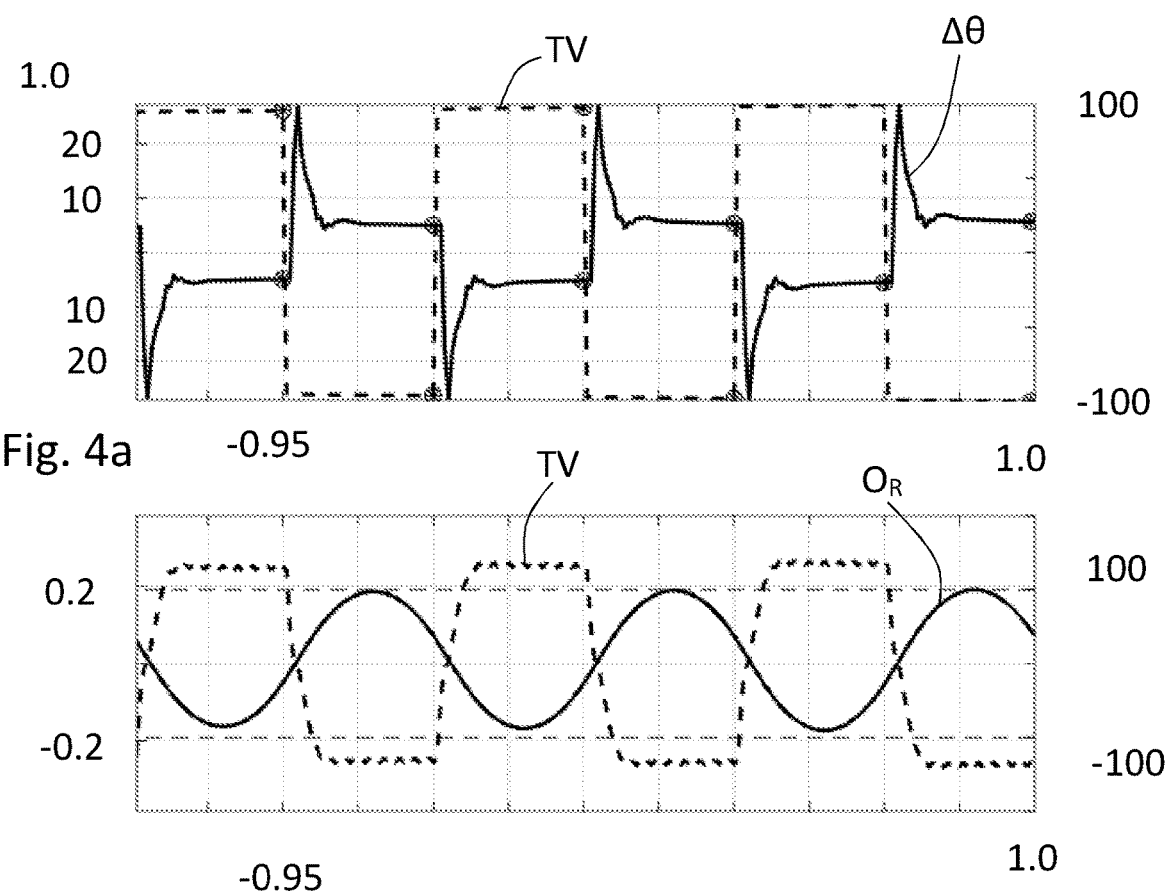
FIG. 4a shows in larger detail the torque and the offset angle as a function of time during a part of the execution of the method according to an embodiment of the invention
FIG. 4b shows in larger detail the torque and the oscillations of the rotor as a function of time during a part of execution of the method according to an embodiment of the invention.

FIG. 4a shows in larger detail the torque values TV and the resulting offset angles $\Delta\theta$ as a function of time for times between 0.94 s to 1 s. The offset angle $\Delta\theta$ is shown on the left axis while the torque values TV are shown on the right axis as the ratio of the maximum torque. FIG. 4b shows the torque values TV as a percentage of the maximum torque on the right axis and the resulting rotor oscillations $O_R$ in degrees on the left axis as a function of time for times between 0.94 s to 1 s.

Figure 5:
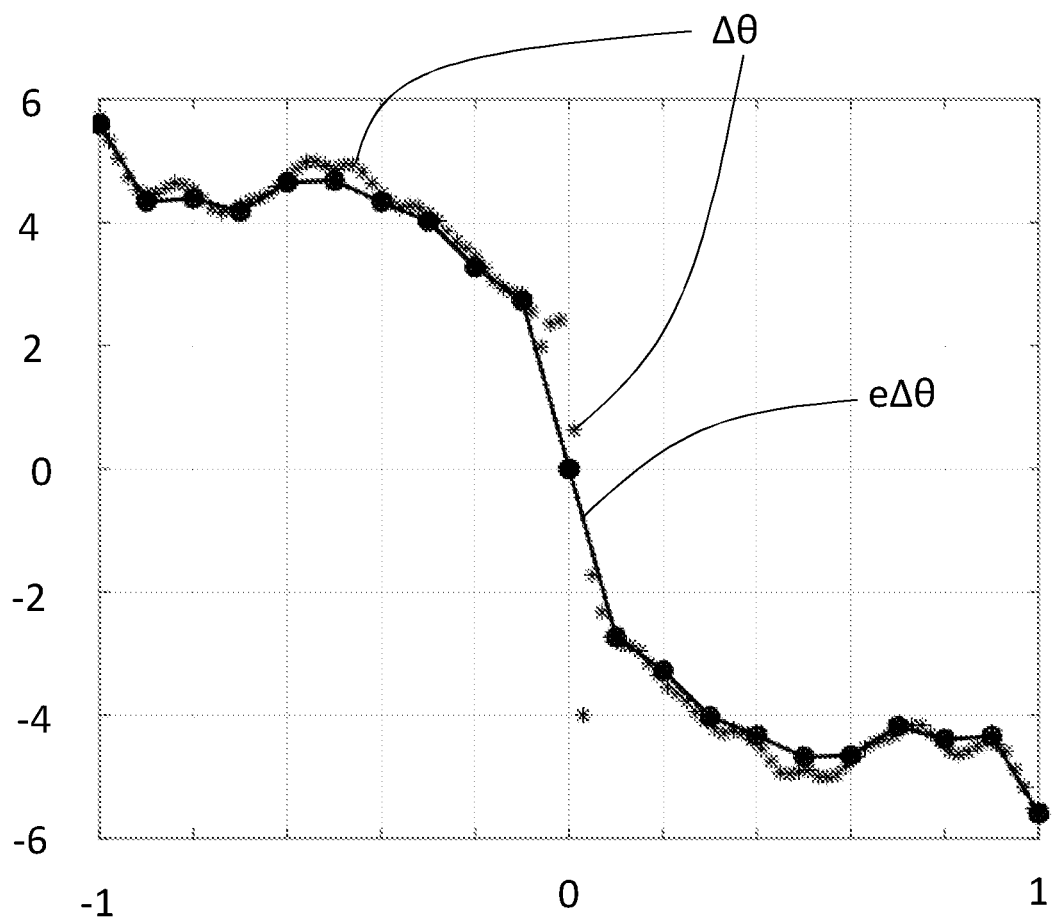
FIG. 5 shows the offset angle as a function of the torque as measured in comparison with the offset angle as a function of the torque as simulated.

FIG. 5 shows a comparison between estimated offset angle $\Delta\theta$ using the described method above and a simulated offset angle $e\Delta\theta$ using locked rotor as a function of the ratio of the maximum torque from the machine.

The described method may be used as an initialization run at setup of an electric machine. In such an initialization run the torque is preferably varied between 0 and 100% of the maximum torque. A good estimation may be achieved by using resulting torque values in the machine which increases from a value in the range of 0-10% of the maximum torque to a value of 80-100% of the maximum torque.

It is not necessary to perform the method by increasing the amplitude of the torque. It is also possible to use decreasing torque values. The resulting torque values of the machine could be arranged to decrease from a value in the range of 80-100% of the maximum torque to a value of 0-10% of the maximum torque.

The described embodiments may be amended in many ways without departing from the scope of the present invention, which is limited only by the amended claims.

The invention claimed is:

1. A method for estimating a position of a rotor in a synchronous electric machine, wherein the method comprises the steps of:
   inputting an initial rotor angle, in a known reference frame, into a power converter controlling the electric machine,
   injecting a first voltage waveform into the power converter, wherein the first voltage waveform has a first fundamental frequency and includes a component along a first axis of the reference frame and a component along a second axis being orthogonal to the first axis, and wherein the first voltage waveform is such that it effects the torque from the machine to vary between at least one positive torque value and at least one negative torque value and that the mean output torque is zero,
   injecting a second voltage waveform into the power converter, wherein the second voltage waveform has a second fundamental frequency and includes a component which is offset with an offset angle δθ with respect to the first axis in the reference frame,
   determining a resulting second axis current in the power converter at the second fundamental frequency,
   adjusting, for each torque value, the offset angle δθ so that the resulting second axis current at the second fundamental frequency becomes zero, and storing a respective plurality of offset angle δθ values, and
   estimating the position of the rotor based on the plurality of offset angle values.

2. The method according to claim 1, wherein the power converter comprises a first vector rotator and a second vector rotator, wherein the first vector rotator is arranged to convert, using the initial rotor angle as input, the first voltage waveform and the second voltage waveform in the reference frame to voltages in the stationary frame of the electric machine, and wherein the second vector rotator is arranged to convert using the initial rotor angle as input, the currents in the electric machine from the stationary frame of the electric machine to the reference frame.

3. The method according to claim 2, wherein the first voltage waveform has incrementally increasing or decreasing amplitude.

4. The method according to claim 2 wherein the frequency of the first voltage waveform is 20-100 Hz.

5. The method according to claim 2, wherein the frequency of the second voltage waveform is higher than the frequency of the first voltage waveform, and preferably higher than 200 Hz.

6. The method according to claim 2, wherein the adjusting, for each torque value, of the offset angle δθ is performed using a control loop feedback mechanism.

7. The method according to claim 1, wherein the first voltage waveform has incrementally increasing or decreasing amplitude.

8. The method according to claim 7, wherein the amplitude increases in such a way that the resulting torque of the machine increases from a value in the range of 0-10% of the maximum torque to a value of 80-100% of the maximum torque.

9. The method according to claim 7, wherein the amplitude decreases in such a way that the resulting torque of the machine decreases from a value in the range of 80-100% of the maximum torque to a value of 0-10% of the maximum torque.

10. The method according to claim 1 wherein the frequency of the first voltage waveform is 20-100 Hz.

11. The method according to claim 1, wherein the frequency of the second voltage waveform is higher than the frequency of the first voltage waveform, and preferably higher than 200 Hz.

12. The method according to claim 1, wherein the adjusting, for each torque value, of the offset angle δθ is performed using a control loop feedback mechanism.

13. The method according to claim 12, wherein the control loop feedback mechanism applies a correction based on at least an integral term, preferably an integral and a proportional term.

14. A non-transitory computer-readable medium storing a computer program comprising computer executable components which when executed by processing circuitry of a control system causes the control system to perform the following steps:
   inputting an initial rotor angle, in a known reference frame, into a power converter controlling the electric machine, injecting a first voltage waveform into the power converter, wherein the first voltage waveform has a first fundamental frequency and includes a component along a first axis of the reference frame and a component along a second axis being orthogonal to the first axis, and wherein the first voltage waveform is such that it effects the torque from the machine to vary between at least one positive torque value and at least one negative torque value and that the mean output torque is zero,
   injecting a second voltage waveform into the power converter, wherein the second voltage waveform has a second fundamental frequency and includes a component which is offset with an offset angle δθ with respect to the first axis in the reference frame,
   determining a resulting second axis current in the power converter at the second fundamental frequency,
   adjusting, for each torque value, the offset angle δθ so that the resulting second axis current at the second fundamental frequency becomes zero, and storing a respective plurality of offset angle δθ values, and
   estimating the position of the rotor based on the plurality of offset angle values.

15. A control system for controlling an electrical machine, wherein the control system comprises:
   processing circuitry, and
   a storage medium having a computer program which when executed by the processing circuitry causes the control system to perform the following steps:
   inputting an initial rotor angle, in a known reference frame, into a power converter controlling the electric machine,
   injecting a first voltage waveform into the power converter, wherein the first voltage waveform has a first fundamental frequency and includes a component along a first axis of the reference frame and a component along a second axis being orthogonal to the first axis, and wherein the first voltage waveform is such that it effects the torque from the machine to vary between at least one positive torque value and at least one negative torque value and that the mean output torque is zero,
   injecting a second voltage waveform into the power converter, wherein the second voltage waveform has a second fundamental frequency and includes a component which is offset with an offset angle δθ with respect to the first axis in the reference frame,
   determining a resulting second axis current in the power converter at the second fundamental frequency, adjusting, for each torque value the offset angle δθ so that the resulting second axis current at the second fundamental frequency becomes zero, and storing a respective plurality of offset angle δθ values, and estimating the position of the rotor based on the plurality of offset angle values.

16. An electrical power system comprising:

an electrical machine, a power converter configured to control the electrical machine, a control system configured to control the power converter, and a control system for controlling the electrical machine, wherein the control system for controlling the electrical machine comprises:

processing circuitry, and a storage medium having a computer program which when executed by the processing circuitry causes the control system to perform the following steps:

inputting an initial rotor angle, in a known reference frame, into a power converter controlling the electric machine, injecting a first voltage waveform into the power converter, wherein the first voltage waveform has a first fundamental frequency and includes a component along a first axis of the reference frame and a component along a second axis being orthogonal to the first axis, and wherein the first voltage waveform is such that it effects the torque from the machine to vary between at least one positive torque value and at least one negative torque value and that the mean output torque is zero, injecting a second voltage waveform into the power converter, wherein the second voltage waveform has a second fundamental frequency and includes a component which is offset with an offset angle δθ with respect to the first axis in the reference frame, determining a resulting second axis current in the power converter at the second fundamental frequency, adjusting, for each torque value, the offset angle δθ so that the resulting second axis current at the second fundamental frequency becomes zero, and storing a respective plurality of offset angle δθ values, and estimating the position of the rotor based on the plurality of offset angle values.

* * * * *